US007012033B2

(12) United States Patent
Hayes et al.

(10) Patent No.: US 7,012,033 B2
(45) Date of Patent: Mar. 14, 2006

(54) FLUOROCHEMICAL-CONTAINING TEXTILE FINISHES THAT EXHIBIT WASH-DURABLE SOIL RELEASE AND MOISTURE WICKING PROPERTIES

(75) Inventors: Heather J. Hayes, Chesnee, SC (US); Xinggao Fang, Duncan, SC (US); Sidney S. Locke, Jr., Greer, SC (US)

(73) Assignee: Milliken and Company, Spartanburg, SC (US)

( * ) Notice: Subject to any disclaimer, the term of this patent is extended or adjusted under 35 U.S.C. 154(b) by 225 days.

(21) Appl. No.: 10/351,014

(22) Filed: Jan. 24, 2003

(65) Prior Publication Data

US 2004/0224587 A1 Nov. 11, 2004

Related U.S. Application Data

(63) Continuation-in-part of application No. 10/321,907, filed on Dec. 17, 2002, now abandoned.

(51) Int. Cl.
*B32B 27/12* (2006.01)
*B32B 27/04* (2006.01)

(52) U.S. Cl. .......................... 442/93; 442/94; 442/118; 442/164; 442/181; 442/327

(58) Field of Classification Search .................. 442/93, 442/94, 118, 181, 327, 164
See application file for complete search history.

(56) References Cited

U.S. PATENT DOCUMENTS 3,377,249 A 4/1968 Marco ......................... 8/115.6
3,540,835 A 11/1970 Marco ......................... 8/115.6
3,563,795 A 2/1971 Williams et al. .......... 117/139.4
3,574,620 A 4/1971 Tesoro ....................... 117/62.1
3,574,791 A 4/1971 Sherman et al. ............ 260/884
3,598,641 A 8/1971 Miller et al. .......... 117/138.8 E
3,620,826 A 11/1971 Machell ............. 117/139.5 CQ
3,625,754 A 12/1971 Dunn ................... 117/138.8 F
3,632,420 A 1/1972 Kuhn ................... 117/138.8 F
3,649,165 A 3/1972 Cotton ........................ 8/115.5
3,650,801 A 3/1972 Hinton, Jr. et al. ........ 117/47 A
3,652,212 A 3/1972 Machell ....................... 8/115.5
3,660,010 A 5/1972 Georgoudis et al. ......... 8/115.6
3,676,052 A 7/1972 Harper, Jr. et al. .......... 8/115.6
3,690,942 A 9/1972 Vandermans et al. . 117/138.8 F
3,798,169 A 3/1974 Dickson et al. ............... 252/89
3,897,206 A 7/1975 Kearney ........................ 8/120
3,981,807 A 9/1976 Raynolds .................... 252/8.8
4,014,857 A 3/1977 Schmoyer .............. 260/67.6 R
4,068,035 A 1/1978 Violland et al. ............ 428/279
4,073,993 A 2/1978 Lark .......................... 428/261
4,090,844 A 5/1978 Rowland ....................... 8/120
4,131,550 A 12/1978 Marco ........................ 252/8.6
4,164,392 A 8/1979 Hauser et al. ................ 8/18 R
4,168,954 A 9/1979 Marco ......................... 8/18 R
4,207,071 A 6/1980 Lipowitz et al. ............. 8/115.6
4,290,765 A 9/1981 Sandler ....................... 8/115.6
4,427,557 A 1/1984 Stockburger ................ 252/8.7
4,695,488 A 9/1987 Hisamoto et al. ........ 427/385.5
4,861,501 A * 8/1989 Pfeifer ........................ 442/94
4,937,277 A 6/1990 O'Lenick, Jr. .............. 524/318
6,233,795 B1 5/2001 Dischler ........................ 26/28
6,383,633 B1 * 5/2002 Allewaert et al. .......... 428/375
6,818,253 B1 11/2004 Kimbrell ................. 427/393.4
6,824,854 B1 * 11/2004 Materniak et al. ............ 428/96
2003/0116744 A1 * 6/2003 Kimbrell ................... 252/8.62
2005/0056805 A1 * 3/2005 Fang et al. ................ 252/8.62

OTHER PUBLICATIONS

AATCC Test Method 103-2000.

* cited by examiner

*Primary Examiner*—Ula Ruddock
(74) *Attorney, Agent, or Firm*—Terry T. Moyer; Brenda D. Wentz

(57) ABSTRACT

Wash-durable fluorochemical-containing textile and/or fiber treatments that simultaneously impart soil resistance (or soil-release) properties and moisture wicking characteristics to target fabric substrates are provided. Such treatments surprisingly impart these two simultaneous effects to target fabrics and/or fibers because fluorochemicals generally provide moisture repellency rather than moisture wicking capabilities. As prior soil release/moisture wicking treatments do not function properly, or, alternatively, compromise hand or other properties of certain target textiles after treatment application, a new, effective, soil release/moisture wicking formulation for such purposes was needed. The inventive treatment is extremely durable on such fabric substrates; after a substantial number of standard launderings and dryings, the treatment does not wear away in any appreciable amount and thus the substrate retains its soil release/moisture wicking properties. The method of adherence to the target yarn, fiber, and/or fabric may be performed any number of ways, most preferably through the utilization of a jet dyeing system or through a steam-transfer method. The particular methods of adherence, as well as the treated textile fabrics and individual fibers are also encompassed within this invention.

6 Claims, No Drawings

FLUOROCHEMICAL-CONTAINING TEXTILE FINISHES THAT EXHIBIT WASH-DURABLE SOIL RELEASE AND MOISTURE WICKING PROPERTIES

CROSS REFERENCE TO RELATED APPLICATIONS

This application is a continuation-in-part of application Ser. No. 10/321,907, filed on Dec. 17, 2002 now abandoned. This parent application is herein entirely incorporated by reference.

FIELD OF THE INVENTION

This invention relates to wash-durable fluorochemical-containing textile and/or fiber treatments that simultaneously provide soil-release properties and moisture wicking characteristics. Such treatments surprisingly impart these two simultaneous effects to target fabrics and/or fibers because fluorochemicals generally provide moisture repellency rather than moisture wicking capabilities. As prior soil release/moisture wicking treatments do not function properly, or, alternatively, compromise hand or other properties of certain target textiles after treatment application, a new, effective, soil release/moisture wicking formulation for such purposes was needed. The inventive treatment is extremely durable on such fabric substrates; after a substantial number of standard launderings and dryings, the treatment does not wear away in any appreciable amount and thus the substrate retains its soil release/moisture wicking properties. The method of adherence to the target yarn, fiber, and/or fabric may be performed any number of ways, most preferably through the utilization of a jet dyeing system or through a steam-transfer method. The particular methods of adherence, as well as the treated textile fabrics and individual fibers are also encompassed within this invention.

DISCUSSION OF THE PRIOR ART

There has been a tremendous effort over many years to bring about acceptance of textiles comprising synthetic fibers therein, particularly within the apparel, napery, and other like market areas (such as within any of the following U.S. Pat. Nos. 3,377,249; 3,540,835; 3,563,795; 3,574,620; 3,598,641; 3,620,826; 3,632,420; 3,649,165; 3,650,801; 3,652,212; 3,660,010; 3,676,052; 3,690,942; 3,897,206; 3,981,807; 3,625,754; 4,014,857; 4,073,993; 4,090,844; 4,131,550; 4,164,392; 4,168,954; 4,207,071; 4,290,765; 4,068,035; 4,427,557; and 4,937,277; these patents are accordingly incorporated herein by reference). In particular, polyester-based fabrics, being inexpensive and available in large supply, have required modifications to impart moisture wicking properties (either for wearer comfort for apparel fabrics or, for uses such as napery, for the ability to permit adhesion of unwanted liquids or other spills to prevent transfer to a user's clothing or skin) as well as soil release characteristics (for an ease in cleaning the particular fabric substrate). Generally, as alluded to above, such synthetic fibers, yarns, and/or fabrics, particularly those including polyester, do not exhibit such moisture wicking and soil release properties. Thus, there exists the need to modify such synthetic fabrics (or at least fabrics comprising at least some synthetic components, as in polyester/cotton blends, as one non-limiting example).

However, even with the ability to impart such necessary properties to a target synthetic-yarn-containing fabric, other concerns must be met. For example, hand, the general feel and texture of a textile, is of great importance with many fabric end-uses. The application of certain surface treatments can deleteriously affect hand characteristics even if moisture wicking and soil release properties are supplied. Thus, it is imperative that any surface modifying treatments impart desirable chemical characteristics while also not compromising the hand or other like physical property of the target synthetically based fabric. Furthermore, since most, if not all, end-uses for such synthetically based fabrics require laundering for removal of staining and soiling thereon, it is also imperative that such fabrics exhibit wash durability in that the surface modifying treatments are not easily removed through use and/or laundering and ultimately exhibit long-term reliable soil release, moisture wicking, and hand characteristics (at the very least) to permit cost-effective use of such fabrics to the purchaser.

Of major concern has been the difficulty of cleaning fabrics made from polyester fibers using conventional home and/or industrial washing procedures due to the oleophilic nature of the garments made from textile materials of polyester fibers. Thus, numerous efforts have been proposed to alter the oleophilic properties of the textile material produced from polyester fibers so that dirt and/or oily deposits on the soiled textiles can readily be removed by such a home washing procedure. However, in altering the oleophilic characteristics of the textile material care must be exercised to insure that the hand of the fabric does not become hard which would result in discomfort to the wearer or user of the target fabric.

In attempting to solve the problem of soiling in synthetic fabrics a substantial amount of research has been conducted in the past as a result thereof. Further, much effort has been directed to the use of blends containing synthetic fibers and naturally occurring fibers in order to produce a resulting blend which possesses the desired soil release properties and the desired hand properties. Thus, attempts have been made to reduce the oleophilic characteristics of synthetic fibers, such as polyester, by coating the fibers with a coating that is oleophobic, i.e., one that will hinder the attachment of soil or oily materials to the fiber. Many polymer systems have been proposed which are capable of forming a film around the fibers that constitute the textile material, particularly acid emulsion polymers prepared from organic acids having reactive points of unsaturation. Typical of such acid emulsion polymers is set forth in U.S. Pat. No. 3,377,249 wherein soil release and durable press characteristics of linear polyester fibers are improved by application of an admixture comprising an amino-plast textile resin, a textile resin catalyst and a synthetic acid emulsion polymer. The resulting resin composition, so applied, is thereafter cured.

In addition, efforts have been made to improve the soil release characteristics of synthetic fibers during the conventional home washing operation. Such a process is set forth in U.S. Pat. No. 3,798,169 wherein a polycarboxylate polymer having an acid equivalent weight of from about 110 to 175 is precipitated from a dilute solution containing such polymer by the use of a water soluble salt of a polyvalent metal. Thus, the solution polymer is caused to be deposited upon the fabric during the final rinse cycle in the home cleaning process.

However, even in view of the above and numerous other processes and compositions which have heretofore been advanced by the prior art research is constantly being conducted to develop new and improved compositions and processes for imparting durable source soil release characteristics to polyester fibers and to textile materials formed therefrom so that garments made of polyester textile materials can readily be cleaned in both a home washing operating and a commercial cleaning process. Accordingly, by virtue of the teachings of the present invention, problems historically present with the use of garments produced from textile materials of polyester fibers are substantially alleviated and a durable soil release characteristic is achieved.

As non-limiting examples of the aforementioned hand problem, certain new fabrics comprised of synthetic fibers in configurations such as tightly woven filament fabric, spun-containing fabric, microdenier fabric, flat fabric, and nonwoven (filament, microdenier, and/or staple fibers) fabric structures, have been traditionally provided or recently developed that exhibit effective moisture wicking and excellent hand properties. In particular, the tightly woven filament fabric and/or spun yarn-containing fabric appear to provide levels of hand heretofore unforeseen, particularly for polyester-based textiles. Unfortunately, the soil release characteristics of such woven and nonwoven types of fabric as noted above are lacking to the degree necessary to permit widespread use (for napery purposes, for example). As noted above, there are typical polyester treatments (such as U.S. Pat. Nos. 3,798,169 and 3,377,249, as examples) that impart the aforementioned desired chemical and physical attributes to certain target textured polyester-based fabrics; however, these particular types of problematic woven and/or nonwoven fabrics noted above (e.g., tightly woven filament fabric and/or spun yarn-containing fabric) are not compatible with such traditional polyester treatments such that either the treatment lacks the necessary durability (of either the soil release or moisture wicking properties) or the treated fabric's hand properties are compromised to too great a degree for proper utilization by the end-user. Furthermore, in some situations, the needed levels of moisture wicking and soil release properties are unavailable unless the target fabrics are first industrially washed, only to lose such characteristics soon thereafter.

There is thus a need to provide a new type of treatment for the effectuation of such needed soil release and moisture wicking characteristics to synthetically based fabrics that also does not deleteriously affect the hand or other like property or properties of the same target fabric, all with a wash durability that exceeds the standard level (i.e., 5 standard industrial launderings, or, preferably at least 10–20 such launderings). To date, the only treatment types that have met this specific previous uses have been based upon amino-plast, polycarboxylate acid, sulfonated and/or ethoxylated polyester, and other types of technology. To date, no surface modification treatments have been developed specifically with tightly woven filament fabric, spun yarn-containing polyester fabric, polyester microdenier fabric, synthetic nonwoven fabric, synthetic flat fiber-containing fabric, and the like, in mind, nor, for that matter, that include fluorine-based chemicals for that or for any other purpose, with the end-product being a fabric that meets all of the above-discussed all-important requirements for synthetically based fabrics. There is thus a great need for such a particular surface modification treatment formulation and application to synthetically based fibers, yarns, and/or fabrics.

DESCRIPTION OF THE INVENTION

It is therefore an object of the present invention to provide a textile material formed of tightly woven synthetic filament fabric and/or spun yarn-containing polyester fabric (or any of the other unique fabric constructions noted previously) exhibiting wash-durable soil release and moisture wicking characteristics with acceptable hand levels. Still another object of the present invention is to provide a process for imparting durable soil release characteristics to such specific textile materials formed of spun synthetic yarn, tightly woven filament polyester fibers, microdenier polyester fibers, nonwoven synthetic fibers, flat non-textured synthetic fibers, and any blends with each other or with other types of natural or synthetic fibers. Additionally, a further object is to provide a fluorochemically based textile treatment formulation that imparts such desirable wash-durable characteristics to synthetically based fabrics.

Accordingly, this invention encompasses a treated textile substrate comprising at least 25% by weight of synthetic fiber component (preferably at least 50%, more preferably at least 75%, and most preferably all synthetic fiber), wherein said substrate is treated with at least one fluorochemical, wherein said substrate exhibits a soil release property in excess of or equal to 3.0 as measured by AATCC Test Method 130-2000 and a moisture wicking property less than or equal to 10 seconds, preferably less than or equal to 6, as measured by a water-drop surface spreading test protocol; wherein said soil release property and said moisture wicking properties are exhibited by said substrate after exposure to at least 5 industrial launderings (the protocol for which defined below in greater depth). Also, and alternatively, this invention encompasses a treated textile substrate comprising at least 25% of polyester fibers wherein said fibers are present within said substrate in a configuration selected from the group consisting of tightly woven filament synthetic yarns, spun synthetic yarns, synthetic microdenier yarns of at most an average denier of 1.0, nonwoven synthetic fibers, flat non-textured synthetic yarns, and blends of any such yarns with each other or with any other type of natural or synthetic fibers or yarns; wherein said substrate exhibits a soil release property measured as wherein said substrate exhibits a soil release property in excess of or equal to 3.0 as measured by AATCC Test Method 130-2000 and a moisture wicking property less than or equal to 10 seconds, preferably less than or equal to 6, as measured by a water-drop surface spreading test protocol; wherein said soil release property and said moisture wicking properties are exhibited by said substrate after exposure to at least 5 industrial launderings. Such an invention also encompasses the different methods of producing such inventive treated substrates. The wash durability test noted above is standard and, as will be well appreciated by one of ordinary skill in this art, is not intended to be a required or limitation within this invention. Such a test method merely provides a standard which, upon 5 washes (and preferably more, such as in excess of 10, and more preferably even higher, such as 20, such industrial washes) in accordance with such, the inventive treated substrate will not lose an appreciable amount of its soil release and/or moisture wicking finish.

Nowhere within the prior art has such a specific treated substrate or method of making thereof been disclosed, utilized, or fairly suggested. The closest art, which fails to disclose the same inventive soil release and moisture wicking durable finishes herein taught, includes U.S. Pat. Nos. 3,574,791, 4,007,305, 4,695,488, and 6,383,633.

As certain synthetic components are required within the inventive textile substrates, any such synthetic yarns, fabrics, or films may be utilized as the substrate within this application. Thus, any of polyesters, polyamides, polyolefins, polyaramides, and the like, or combinations of these fiber types, or, alternatively, blends with natural fibers, such as cotton, wool, ramie, and the like, may constitute the target substrate. As for the required synthetic types, for instance, and without intending any limitations therein, polyolefins, such as polyethylene, polypropylene, and polybutylene, halogenated polymers, such as polyvinyl chloride, polyesters, such as polyethylene terephthalate, poly(lactic acid), and poly(butylene terephthalate), polyester/polyethers, polyamides, such as nylon 6 and nylon 6,6, polyurethanes, as well as homopolymers, copolymers, or terpolymers in any combination of such monomers, and the like, may be utilized within this invention. Nylon-6, nylon-6,6, polypropylene, and polyethylene terephthalate (a polyester) are particularly preferred. Additionally, the target fabric may be coated with any number of different films, including those listed in greater detail below. Furthermore, the substrate may be dyed or colored to provide other aesthetic features for the end user with any type of colorant, such as, for example, poly(oxyalkylenated) colorants, as well as pigments, dyes, tints, and the like. Other additives may also be present on and/or within the target fabric or yarn, including antistatic agents, brightening compounds, nucleating agents, antioxidants, UV stabilizers, antimicrobial agents, fillers, permanent press finishes, softeners, lubricants, curing accelerators, and the like.

The particular treatment must comprise at least one type of fluorochemical compound to impart the needed soil release property as well as at least one other compound and/or polymer that imparts the needed moisture wicking characteristics thereto simultaneously. The problems of utilizing fluorochemical treatments in the past in such a specific moisture wicking application is that such components are inherently and greatly water repellent. As a result, the ability of such a fluorochemical treatment in the past to impart the needed simultaneous soil release and moisture wicking properties were, to say the least, nonexistent, at least to the extent that industrial wash durability is exhibited simultaneously. The closest art teaches at best initial non-washed simultaneous soil release and moisture wicking properties for fluorochemical-containing textiles finishes; however, such finishes are non-durable and are easily removed once industrial washing is accomplished.

Surprisingly, it has now been found that certain combinations and application procedures of such a fluorochemical component and the above-noted at least one other moisture wicking compound and/or polymer can actually be applied to fabric substrates and surfaces to the extent that the desired dual-property (soil release and moisture wicking) result can be achieved, particularly on a wash-durable basis. Again, in the past, it has been in essence an insurmountable problem to apply such a fluorochemical treatment to synthetic fabric substrates and achieve a moisture wicking result. Thus, there was no rational basis for the ordinarily skilled artisan within this particular art to utilize such fluorochemical treatments for moisture wicking end-uses, no matter how acceptable such treatments were in terms of soil release characteristics. However, the advent of new tightly woven and/or spun yarn polyester fabric applications, and the difficulty of durably treating such substrates with typical prior soil release/moisture wicking treatment formulations has led to the discovery that certain combinations and/or treatment procedures not only permit, but apparently require, fluorochemically based treatments for proper application of any such soil release technology to at least these specific tightly woven and/or spun yarn-based polyester fabric substrates. Thus, utilizing this specific end-use fabric as a starting point, it has further been realized that other end-use fabrics may be treated with such fluorochemically based treatments to impart these durable properties to different textiles as well.

The term fluorochemical in terms of this invention is thus intended to include any compound and/or polymer, including at least one monomer or pendant group containing at least one moiety having a carbon-fluorine bond therein, that imparts industrial wash durability soil release properties to synthetic fibers (polyesters, as one non-limiting example). Non-limiting, though preferred fluorochemicals of this type include compounds and/or polymers including the aforementioned at least one carbon-fluorine-containing moiety and pendant groups or monomers of a hydrophilic nature. Generally, fluorinated compounds and/or polymers do not exhibit textile surface soil release properties unless such hydrophilic groups or monomers are actually present thereon. A hydrophilic monomer or pendant group (such as an acid functionality, acid salts, base functionality, amides, urethanes, hydroxyls, an oxyalkylenated group, and the like, as non-limiting possibilities) may be present thereon in order to provide some degree of hydrophilicity. Most soil release fluorochemicals of this nature include fluorine-containing acrylate copolymers, urethanes, amide copolymers, polyethers, sulfonyl amides, and the like, within the fluorochemical compound and/or polymer. In general, however, the fluorinated portion of such a component will dominate in terms of soil repellency (as compared with soil release)(and thus potential hydrophobicity of the entire structure) to the extent that the needed soil release characteristics are provided via this fluorochemical in tandem with the necessary hydrophilic portions included therein the compound and/or polymer. Some specific, again non-limiting, though preferred fluorochemical polymers are available from Daikin under the tradenames of Unidyne® TG- 992 and Unidyne® TG-993, as well as from Misubishi under the tradename Repearl® SR-1100. Other possibilities as fluorochemical components for this inventive finish include, again, without limitation, and merely provided as potentially preferred materials for such a purpose, Zonyl® 7910 or 9200 (both from DuPont), FC-258 or PM-490 (both from 3M), and Baygardg® SOC or WSR (both available from Bayer). Such fluorochemicals are believed to exhibit some hydrophilic portions thereon as well as highly desirable soil release capabilities for synthetic fabrics. Again, other fluorochemical compounds and/or polymers may be utilized within this inventive formulation as long as such a fluorochemical imparts the requisite level of soil release characteristics to the target synthetic fiber-based fabric.

Such a fluorochemical component thus accords the necessary soil release properties. However, there remains the necessity of according, simultaneously, a wash durable moisture wicking characteristic as well. This has been accomplished through the inclusion of a number of different alternatives or combinations of typical hydrophilic polymeric treatments simultaneously to the target fabric with the aforementioned fluorochemical. Such hydrophilic agents include, without limitation, ethoxylated polyesters, sulfonated polyesters, cellulose ethers, ethoxylated polyamides, copolymers of vinyl acetate and hydrophilic crosslinking agents, among other potential hydrophilic components. Specifically, such additives are commercially available under the tradenames of Eastman WD Size, Lubril QCX, also from Eastman Chemical, Methocel® A-LV from Dow Chemical, and the like. These preferred, though non-limiting, examples have been found to provide excellent moisture wicking properties to the target synthetic fiber-based fabric even in the presence of the required soil release fluorochemical polymer. These hydrophilic components are generally present in aqueous dispersions (with from about 5–60% solids content; preferably, from 10–40% solids content; and most preferably between about 12–20% solids content).

In particular, it has been found that exhaustion of these two components simultaneously on the target synthetic-based fabric surface imparts the preferred performance levels of both soil release and moisture wicking to the industrial wash durability levels required for long-term effective utilization thereof by the end-user. Particularly preferred, though, again, non-limiting, is the application of such a multi-component finish treatment on target fabrics via a jet dyeing application method. Utilization of such a jet dyeing application has heretofore not been followed in order to impart such characteristics to fabrics through fluorochemical finishes (at least), let alone synthetically based fabrics, due to costs and generally non-acceptance of such a required process step when simple padding methods were more cost-effective and reliable with non-fluorochemical-containing polyester (and other like synthetic fabric) treatment formulations. Without intending on being bound to any specific scientific theory, it is believed that such a jet dye application method permits enmeshment of the two required components at the target fiber and fabric surfaces thereby providing a treatment wherein a theoretical equal number of sites for atmospheric exposure for the fluorochemical (and thus soil release property) and the hydrophilic additive (and thus moisture wicking property) can exist simultaneously. In such a manner, it is believed that an optimum level of both properties may be achieved to the extent that soil release characteristics will be imparted through contact at the fluorochemical-exposed sites with a similar number (at least in theory) of hydrophilic-agent-exposed sites. Thus, complete soil release over the entire fabric may not actually occur; but, with such a theorized enmeshment of both components in this manner, the actual effect is that substantial soil release over a vast actual majority, if not a basic perceived majority, of the target fabric is achieved. Likewise, this apparent phenomenon is available for the moisture wicking component as well.

Additionally, however, it has been found that certain reliable results are also available, though to a lesser extent, particularly in terms of durability, for padded-on blends and/or combinations of both of these particular components. Application of a first layer followed by the next, however, results in either soil release, moisture repellent finishes at the surface, or hydrophilic treatments located at the surface that result in a lack of wash durability for the finish itself. Further alternatives of application of this inventive treatment formulation include, without limitation, simultaneous pad coating (such as, for example, pad steaming), screen coating, spraying, and kiss-coating (particularly for yarn applications). Again, though, it appears that simultaneous application of these two components is required to effectuate the needed industrial wash durable levels of soil release and moisture wicking.

The proportions of the needed components are quite broad in scope, ranging from 0.05 to about 10% by weight of the fluorochemical component, with lower amounts preferred (from about 0.05 to about 5%, and most preferably from about 0.1 to about 2.5%, all in terms of solids add-on on the target fabric). The hydrophilic component should be present in roughly the same basic ranges of amounts (and a substantially 1:1 weight ratio of the two components is most preferred, with less preferred ratios of from 0.5:5 to 5:0.5 and any ratio in between) as the fluorochemical component, with some differences such that the preferred range is from 0.05 to about 10%, more preferably from 0.05 to 5%, and most preferably from 0.3 to about 2% (again, all in terms of solids add-on on the target fabric). The treatments should also include a solvent for dissolution, dispersion, or other like purpose, with a relatively low flash point to permit evaporation after target fabric or yarn surface application. Thus, water, $C_1$–$C_8$ alcohols, and the like, may be present for this purpose, preferably in amounts of from 50 to about 99% by weight of the entire formulation. Again, as noted above, other additives may be present as well for various reasons (dispersion, for example) and to achieve certain peripheral results.

The selected substrate may be any of an individual yarn, a fabric comprising individual fibers or yarns (though not necessarily previously coated yarns), or a film (either standing alone or as laminated to a fabric, as examples). The individual fibers or yarns may be of any typical source for utilization within fabrics, including natural fibers (cotton, wool, ramie, hemp, linen, and the like), synthetic fibers (polyolefins, polyesters, polyamides, polyaramids, acetates, rayon, acylics, and the like), and inorganic fibers (fiberglass, boron fibers, and the like). The target yarn may be of any denier, may be of multi- or mono-filament, may be false-twisted or twisted, or may incorproate multiple denier fibers or filaments into one single yarn through twisting, melting, and the like. The target fabrics may be produced of the same types of yarns discussed above, including any blends thereof. Such fabrics may be of any standard construction, including knit, woven, or non-woven forms.

The yarns are preferably incorporated within specific fabrics, although any other well known utilization of such yarns may be undertaken with the inventive articles (such as tufting for carpets). The inventive fabrics may also be utilized in any suitable application, including, without limitation, apparel, upholstery, bedding, wiping cloths, towels, gloves, rugs, floor mats, drapery, napery, bar runners, textile bags, awnings, vehicle covers, boat covers, tents, and the like. The inventive films may be present on fabrics, or utilized for packaging, as coatings for other types of substrates, and the like.

PREFERRED EMBODIMENTS OF THE INVENTION

Fluorochemical Treatments

The preferred fluorochemically based treatment will generally comprise three required components: the fluorochemical, the moisture wicking component, and a solvent (with any number of other additives available as well, as noted above). Such a fluorochemically based treatment is generally produced and applied to a fabric substrate by first cleaning and prepping the target fabric and subsequently placing the fabric in a jet dyeing apparatus (from Werner Mathis)(as is most preferable for minijet procedures, though not limiting by any means, for this invention) for simultaneous dyeing and applying of the fluorochemical treatment to the target fabric. The particular fluorochemical treatment formulations are provided below for which application and subsequent treated fabric analysis was then followed. Each jet-dyed sample below included a standard dye formulation to impart a forest green color (with CIELAB measurements of L=36.24, a=−17.90, b=6.31, 1=2, and c=1) to the target fabric. Such a green color result provide a very difficult substrate to impart proper soil release properties thereto because of the susceptibility of such a color to indicate the presence of soils and stains thereon.

Thus, this formula was applied to each fabric sample below, either prior to application of the finish or simultaneously therewith (unless marked with an * below, each soil release agent and hydrophilic agent listed below is actually present within aqueous dispersions and include no further additional solvent; those marked with an * below included added water to permit pad treatment therewith).

COMPOSITION TABLE 1

Fluorochemical Treatment Formulations

| Formulation # | Soil Release Agent (% owf) | Hydrophilic Agent (% owf) |
|---|---|---|
| A | 1% UnidyneTG-992 | 2% Lubril QCX |
| B | 2% Unidyne TG-992 | 2% Lubril QCX |
| C | 2% Repearl SR-1100 | 2% Lubril QCX |
| D | 1% Unidyne TG-992 | 5% Eastman WD Size* |
| E | 3.5% Unidyne TG-992 | 3.5% Lubril QCX* |
| F | 2% Unidyne TG-992 | None |
| G | None | 2% Lubril QCX |
| H | 6% Unidyne TG-992 | 6% Lubril QCX |
| (Comparatives) | | |
| I (Control) | None | None |
| J | 2% Unidyne TG-993 | None* |
| K | 5% Unidyne TG-992 | None |

*all weights for this example are by weight of the entire pad bath

These formulations were then applied to target fabrics, the particularly preferred, non-limiting types being described in depth below, with soil release and moisture wicking properties of such treated samples then assessed at different wash intervals. The hydrophilic agents from above were all present as aqueous dispersions with ~15% solids content therein.

The particular fabric substrate was a new one as defined within U.S. patent application Ser. No. 10,304,176, to Love. Specifically, the target fabric was defined as follows (and referred to below as Fabric I):

A 100% polyester filament plain weave fabric was provided. The fabric had 1/300/136 false twist texture yarns in the warp direction, and 3/150/68 false twist textured yarns in the filling direction, and it was woven with 60 ends per inch and 46 picks per inch. The fabric was prepared and dried in a conventional manner.

The fabric was then sanded using an apparatus of the variety described commonly-assigned U.S. Pat. No. 6,233,795, the disclosure of which is incorporated herein by reference. The fabric was fed to abrasive rolls in a face-up configuration at an initial tension of 110 psi and a speed of 20 yards per minute. The fabric was treated on its face by successive treatment rolls at a tension of 300 psi. The abrasive rolls were 400 grit diamond plated rolls of the variety described in the above-referenced patent. The abrasive rolls were turned in a clockwise or counterclockwise direction at a designated percentage of machine speed: the first rotated counterclockwise at a roll ratio of 1800, the second rotated clockwise at a roll ratio of 1780, the third rotated counterclockwise at a roll ratio of 1800, and the fourth rotated clockwise at a roll ratio of 1780. The back of the fabric was then treated by successive rolls as well; the first rotated clockwise at a roll ratio of 2000, the second rotated counterclockwise at a roll ratio of 1980, the third rotated clockwise at a roll ratio of 2000, and the fourth rotated counterclockwise at a roll ratio of 1980. The tension therein at the last roll was 150 psi.

The fabric was then processed in a fluid treatment apparatus of the variety described in commonly-assigned U.S. patent application Ser. No. 09/344,596 to Emery et al.

The fabric, which was 78 inches wide and had a weight of about 6 oz/sq yd, was pulled through the pad and hydraulically processed at a speed of 80 yds/min. The first treatment zone hydraulically treated the front side of the fabric at an energy level of 0.037 hp-hr/lb, and the opposite side of the fabric was then treated at an energy level of 0.022 hp-hr/lb, for a total treatment of 0.059 hp-hr/lb. The fabric was dried and taken up in a conventional manner. The fabric had a finished weight of ~6 oz/sq yd.

An alternative spun yarn polyester product (Fabric II, below) was also produced for treatment that was first treated within the same fluid treatment apparatus as noted above within the Emery et al. patent application ('596). This particular fabric is 100% polyester and is made of spun warp yarns and filament fill yarns. The fabric is constructed as a plain weave and has 55 ends per inch and 44 picks per inch in the greige state. The warp yarn is an open end spun 12/1 (i.e. a 12 singles cotton count yarn) with a twist multiple of 3.6, and the filament filling yarn is a 2/150/34 (i.e. 2 plies of 150 denier yarn, each ply containing 34 filaments) and is an inherently low-shrinkage filling yarn. The greige fabric without size weighs about 5.65 ounces per square yard.

The above fabric is subjected to the following processing. One side of the fabric is subjected to high-pressure water at about 1400 p.s.i.g. (manifold exit pressure) The water originates from a linear series of nozzles which are rectangular (0.015 inches wide (filling direction) X 0.010 inches high (warp direction)) in shape and are equally spaced along the treatment zone. There are 40 nozzles per inch along the width of the manifold. The fabric travels over a smooth stainless steel roll that is positioned 0.110 inches from the nozzles. The nozzles are directed downward about five degrees from perpendicular, and the water streams intersect the fabric path as the fabric is moving away from the surface of the roll. The tension in the fabric within the first treatment zone is set at about 35 pounds.

In the second treatment zone, the opposite side of the fabric is treated with high-pressure water that originates from a similar series of nozzles as described above. In this zone the water pressure is about 700 p.s.i.g., the gap between the nozzles and the treatment roll is 0.160 inches, and the nozzles are directed downward about three degrees from perpendicular. As before, the water streams intersect the fabric path as the fabric is moving away from the surface of the roll. The fabric tension between the treatment zones is set at about 60 pounds, and the fabric exit tension is set at about 60 pounds. Maintenance of these specific tension levels is preferred, but is not necessarily critical to achieve an acceptable result.

The fabric is dried and then subjected to a variety of finishing chemicals. It is pulled to the desired width in a tenter frame, and the finished weight is about 6.25 ounces per square yard. Fabrics having finished weights between about 5 ounces per square yard and about 9 ounces per square yard, and preferably between about 6 ounces per square yard and about 8 ounces per square yard, and most preferably between about 6 ounces per square yard and about 7 ounces per square yard, have been found to be particularly suitable in napery uses.

The treated fabric samples below thus all pertain to this specific non-limiting, preferred filament synthetic-yarn-containing fabric with different treatment formulations and procedures (in terms of additives, temperatures, exposure times, and the like, followed at times). The jet dyeing application method basically meets the following process steps:

| Dye Cycle |
|---|
| a) Heat to 130 degrees Celsius |
| b) Hold for 30 minutes at 130 degrees |
| c) Cool to 40 degrees Celsius |
| d) Decant the liquor and remove the fabric therefrom |

The following examples thus indicate the treatment application procedure for each particular fabric sample Examples 1–7 and the Comparative Examples were applied to Fabric I; Example 8 was applied to Fabric II):

EXAMPLE 1

The clean and prepped fabric from above was jet treated within a Gaston Futura single port plant jet (via the Dye Cycle noted above) with Formulation A and was then dried and heatset at 390° F. for ~1 minute.

EXAMPLE 2

The clean and prepped fabric was jet treated and treated as in Example 1, above, but with inventive treatment Formulation B.

EXAMPLE 3

The clean and prepped fabric was jet treated and treated as in Example 1, above, but with inventive treatment Formulation C.

EXAMPLE 4

A small, clean and prepped fabric sample (~17"×24"), from above, was soaked in a solution of Formulation D briefly before being nipped between a rubber and a steel roll at 40 psi resulting in a wet pick-up of ~65% ("pad treated"). The fabric was then stretched on a pin frame and dried at 300 degrees Fahrenheit for 4 minutes and heatset at 375 degrees Fahrenheit for 2 minutes in a lab convection oven.

EXAMPLE 5

The clean and prepped fabric was treated as in Example 4, above, with Formulation E and dried and heatset to a width of 65" at 390 degrees Fahrenheit for ~1 minute exposure.

EXAMPLE 6

The clean and prepped fabric was placed in a Werner Mathis minijet to sequentially treat with a soil releasing fluorochemical then dye and treat the fabric with a hydrophilic agent. The soil releasing fluorochemical (Formulation F) used was thus first applied with subsequent addition of Formulation G. The fabric was removed from the jet and dried and heatset to a width of 65" at 390 degrees Fahrenheit for ~1 minute exposure.

EXAMPLE 7

The clean and prepped fabric was placed in a minijet to sequentially dye and treat with a hydrophilic agent then treat the fabric with a soil releasing fluorochemical. The hydrophilic agent (Formulation G) used was thus first applied with subsequent addition of Formulation F. The fabric was removed from the jet and dried and heatset to a width of 65" at 390 degrees Fahrenheit for ~1 minute exposure.

EXAMPLE 8

The clean and prepped fabric was jet dyed and treated as in Example 1, above, but with inventive treatment Formulation H.

COMPARATIVE EXAMPLE 1 (Control)

The clean and prepped fabric was placed in a Gaston County Futura (single port) plant jet to dye the fabric using Comparative Formulation I. The fabric was removed from the jet and dried and heatset to a width of 65" at 390 degrees Fahrenheit for ~1 minute exposure.

COMPARATIVE EXAMPLE 2

The clean and prepped fabric was pad treated using the same procedure outlined in Example 4, above, to treat the fabric with a the comparative soil releasing fluorochemical alone (Formulation J). The fabric was removed from the jet and dried and heatset to a width of 65" at 390 degrees Fahrenheit for ~1 minute exposure.

COMPARATIVE EXAMPLE 3

The clean and prepped fabric was placed in a mini-jet to dye and treat the fabric with a the soil releasing fluorochemical alone (Formulation K). The fabric was removed from the jet and dried and heatset to a width of 65" at 390 degrees Fahrenheit for ~1 minute exposure.

The resultant inventive and comparative fabrics were then tested for wash durable soil release (corn oil) and moisture wicking (droplet surface dispersion) properties. Such test protocols were as follows:

Soil Release

Soil release testing followed the procedure outlined in AATCC # 130–2000, with the exception that the wash procedure was modified to a harsher, industrial level laundering process. More specifically, the testing can be broken into three separate steps—staining, washing, and rating. The staining step involved the application of 5 drops of liquid staining compound (Mazola® corn oil for this particular test, although other liquids, such as mustard, etc., could also be utilized) onto the same location on the fabric surface, which was resting on a sheet of blotting paper to absorb the excess liquid passing through the fabric. The stain was covered with a sheet of glassine paper and a 5 pound weight was applied for 60 seconds. A 23 pound dummy load of like untreated polyester fabric plus the treated fabric sample from the Examples above was then washed in a Milnor 35 pound capacity industrial washing machine in accordance with the following wash procedure:

| Wash Procedure |
|---|
| a) Flush with 120 degree Fahrenheit water for 3 minutes |
| b) Add 6 oz Flo-Kon® and 3 oz Flo-Sol® to 160 degree F. water and wash for 18 minutes |
| c) Rinse with 140 degree F water for 2 minutes |
| d) Rinse with 120 degree F water for 2 minutes |
| e) Rinse with 100 degree F water for 2 minutes |
| f) Add sour (½ oz of Flo-New®) and wash for 8 minutes at 90 degrees |
| g) Extract for 5 minutes |

The Flo-Kon, Flo-Sol, and Flo-New additives are all commercially available from U.N.X., Inc. The staining step was followed prior to each subsequent test wash to determine the durable nature of the finish to facilitate soil release as needed during the useful life of the target fabric article.

The fabric was then tumble dried for 25 minutes on high heat in a Huebsch Originators 50 industrial dryer and was then rated using the AATCC Test Method 130–2000 standard rating system between 1 and 5. A rating of one indicates a highly visible stain and a rating of 5 represents a stain that was completely removed. The data in the tables below represent an average of five sample assessments each.

Water Droplet Wicking

Water droplet wicking (or just wicking) tests were conducted by placing a drop of water on the fabric surface and measuring the time in seconds required for the reflective water surface to completely disappear.

The results for such testing protocols were as follows:

TABLE 1

Mazola ® Corn Oil Soil Release of Treated Samples

| | Rating After X Washes (Stain After X − 1 Washes) | | | |
|---|---|---|---|---|
| Example | X = 1 | X = 5 | X = 10 | X = 20 |
| 1 | 3.0 | 4.0 | 4.0 | 3.5 |
| 2 | 4.0 | 4.2 | 4.2 | 3.5 |
| 3 | 3.7 | 3.7 | 3.0 | — |
| 4 | 5.0 | — | 3.0 | — |
| 5 | 4.5 | 4.0 | 4.0 | 2.0 |
| 6 | 5.0 | 5.0 | 5.0 | 3.7 |
| 7 | 3.5 | 3.0 | 3.0 | — |
| 8 | 4.0 | — | 4.0 | — |
| Comparative 1 | 1.5 | 1.5 | 1.5 | — |
| Comparative 2 | 4.0 | — | 2.0 | — |
| Comparative 3 | 4.5 | 3.7 | 3.7 | 3.7 |

TABLE 2

Water Droplet Wicking (seconds) of Treated Samples

| | Wicking Time After X Washes | | | |
|---|---|---|---|---|
| Example | X = 0 | X = 4 | X = 9 | X = 19 |
| 1 | 4 | 2 | 1 | <1 |
| 2 | 6 | <1 | <1 | <1 |
| 3 | 4.5 | <1 | <1 | — |
| 4 | 3 | — | 2 | — |
| 5 | <1 | — | 5 | <1 |
| 6 | >10 | — | >10 | — |
| 7 | >10 | 1 | 1 | — |
| 8 | 1 | 1.5 | 2 | — |
| Comparative 1 | 1 | 1.5 | 2 | — |
| Comparative 2 | >20 | — | <1 | — |
| Comparative 3 | >20 | >20 | >20 | >20 |

Thus, the inventive fluorochemically based fabric treatments provided noticeable and unexpected simultaneous wash-durable moisture wicking and soil release properties for synthetically based textiles.

There are, of course, many alternative embodiments and modifications of the present invention which are intended to be included within the spirit and scope of the following claims.

What is claimed is:

1. A textile article comprising at least 25% by weight of a synthetic fiber component, wherein said article is treated with a finish comprising at least one soil release fluorochemical and at least one hydrophilic agent, wherein said hydrophilic agent is selected from the group consisting of ethoxylated polyesters, sulfonated polyester, and ethoxylated polyamides, and wherein said textile article exhibits a moisture wicking property less than or equal to 10 seconds as measured by a water-drop surface spreading test protocol; wherein said moisture wicking properties are exhibited by said substrate after exposure to at least 54 industrial launderings.

2. The treated textile of claim 1 wherein said textile comprises fibers selected from the group consisting of polyesters, polyamides, polyaramides, any blends thereof, any blends thereof with other synthetic fibers, and any blends thereof with natural fibers.

3. The treated textile of claim 2 wherein said fibers are polyester.

4. The treated textile of claim 3 wherein said polyester is polyethylene terephthalate and it is present in an amount of at least 90% by weight of the total weight of the textile.

5. The treated textile of claim 3 wherein said fibers are present in a configuration selected from the group consisting of spun synthetic yarn, tightly woven filament fibers, microdenier polyester fibers, nonwoven synthetic fibers, flat non-textured synthetic fibers, and any blends with each other or with other types of natural or synthetic fibers.

6. A textile article exhibiting a face surface and a back surface, said article comprising at least 25% by weight of a synthetic fiber component, wherein said article is treated with a finish comprising at least one soil release fluorochemical and at least one hydrophilic agent, wherein said hydrophilic agent is selected from the group consisting of ethoxylated polyesters, sulfonated polyester, and ethoxylated polyamides, and wherein said at least one soil release fluorochemical and at least one hydrophilic agent are enmeshed on at least one a portion of at least one of said face surface and said back surface such that said finish exhibits atmospheric exposure sites for both of said soil release fluorochemical and said hydrophilic agent.

* * * * *

UNITED STATES PATENT AND TRADEMARK OFFICE

CERTIFICATE OF CORRECTION

PATENT NO. : 7,012,033 B2
APPLICATION NO. : 10/351014
DATED : March 4, 2006
INVENTOR(S) : Hayes et al.

It is certified that error appears in the above-identified patent and that said Letters Patent is hereby corrected as shown below:

In claim 1,

On line 23 number washes should read --5-- instead of "54"

Signed and Sealed this

Thirtieth Day of January, 2007

JON W. DUDAS
*Director of the United States Patent and Trademark Office*

UNITED STATES PATENT AND TRADEMARK OFFICE
CERTIFICATE OF CORRECTION

PATENT NO. : 7,012,033 B2
APPLICATION NO. : 10/351014
DATED : March 14, 2006
INVENTOR(S) : Hayes et al.

It is certified that error appears in the above-identified patent and that said Letters Patent is hereby corrected as shown below:

In claim 1,

On line 23 number washes should read --5-- instead of "54"

This certificate supersedes Certificate of Correction issued January 30, 2007.

Signed and Sealed this

Sixth Day of March, 2007

JON W. DUDAS
*Director of the United States Patent and Trademark Office*